United States Patent [19]
Baugh et al.

[11] Patent Number: 5,923,797
[45] Date of Patent: Jul. 13, 1999

[54] FREQUENCY-CONTROLLED OPTICAL SWITCH

[75] Inventors: James C. Baugh, Norcross, Ga.; R. James Bateman, New Milford, Conn.

[73] Assignee: Lanhopper System, Inc., Atlanta, Ga.

[21] Appl. No.: 09/041,404

[22] Filed: Mar. 12, 1998

[51] Int. Cl.[6] .................................................. G02B 6/26
[52] U.S. Cl. ............................... 385/16; 385/24; 359/124
[58] Field of Search ........................ 385/16–24; 359/109, 359/114, 115, 117, 124

[56] References Cited

U.S. PATENT DOCUMENTS

| | | | |
|---|---|---|---|
| 4,693,547 | 9/1987 | Soref et al. | 350/96.13 |
| 4,739,520 | 4/1988 | Collins, Jr. et al. | 455/600 |
| 5,189,542 | 2/1993 | Oudar | 359/128 |
| 5,283,844 | 2/1994 | Rice et al. | 385/17 |
| 5,365,359 | 11/1994 | Spillman, Jr. | 359/139 |
| 5,455,878 | 10/1995 | Thaniyavarn | 385/16 |
| 5,465,310 | 11/1995 | Kersten et al. | 385/22 |
| 5,473,712 | 12/1995 | Blow et al. | 385/16 |
| 5,477,362 | 12/1995 | Okamoto et al. | 359/123 |
| 5,528,710 | 6/1996 | Burton et al. | 385/16 |
| 5,574,808 | 11/1996 | van der Tol | 385/28 |
| 5,623,565 | 4/1997 | Blair et al. | 385/24 |
| 5,650,612 | 7/1997 | Criswell et al. | 359/124 X |

Primary Examiner—Phan T. H. Palmer
Attorney, Agent, or Firm—Needle & Rosenberg, P.C.

[57] ABSTRACT

In a frequency-controlled optical switching system, a first light source generates a data signal having a first wavelength. A second light source generates a control signal having a second wavelength, which is different from the first wavelength. A first wavelength division multiplexer, optically coupled to both the first light source and the second light source, couples an optical signal received from the first light source and an optical signal received from the second light source onto a single optical fiber. A second wavelength division multiplexer, optically coupled to the single optical fiber and spaced apart from the first wavelength division multiplexer, separates a signal having the first wavelength from a signal having the second wavelength. The second wavelength division multiplexer couples the signal having the first wavelength onto a second optical fiber and couples the signal having the second wavelength onto a third optical fiber. An optical sensor, optically coupled to the third optical fiber, and sensitive to light of the second wavelength, asserts an electrical signal when the optical sensor senses light of the second wavelength. A switch, that is responsive to the electrical signal, is in a first state when the electrical signal is not asserted and is in a second state when the electrical signal is asserted.

4 Claims, 2 Drawing Sheets

FREQUENCY-CONTROLLED OPTICAL SWITCH

BACKGROUND OF THE INVENTION

1. Field of the Invention

This invention relates to optical communication systems. More particularly, this invention relates to a switch that changes state in response to the detection of electromagnetic radiation of a frequency other than the frequency of a data signal being transmitted through the switch.

2. The Prior Art

Loop-back, in which a signal is sent down one optical fiber and returned on another optical fiber, is a common method of testing for the continuity of an optical communications channel. Most conventional loop-back systems employ a switch at the remote end of the channel that must be manipulated by a control signal transmitted over a separate control channel.

Having a separate control channel for activating a loop-back switch adds cost and complexity to the communications system. Furthermore, if a discontinuity were to develop in the control channel, then the ability to control the loop-back switch would be impaired.

Nowhere does the prior art disclose an apparatus that uses a light of a control wavelength, different from the data wavelength, to control a remote optical switch.

SUMMARY OF THE INVENTION

The above-noted disadvantages of the prior art are overcome by the present invention, which in one aspect is a frequency-controlled optical switching system. A first light source generates a data signal having a first wavelength. A second light source generates a control signal having a second wavelength, which is different from the first wavelength. A first wavelength division multiplexer, optically coupled to both the first light source and the second light source, couples an optical signal received from the first light source and an optical signal received from the second light source onto a single optical fiber. A second wavelength division multiplexer, optically coupled to the single optical fiber and spaced apart from the first wavelength division multiplexer, separates a signal having the first wavelength from a signal having the second wavelength. The second wavelength division multiplexer couples the signal having the first wavelength onto a second optical fiber and couples the signal having the second wavelength onto a third optical fiber. An optical sensor, optically coupled to the third optical fiber, and sensitive to light of the second wavelength, asserts an electrical signal when the optical sensor senses light of the second wavelength. A switch, that is responsive to the electrical signal, is in a first state when the electrical signal is not asserted and is in a second state when the electrical signal is asserted.

An advantage of the invention is that it allows remote control of an optical switch without requiring a separate control line to be run along with an optical fiber carrying data.

These and other advantages will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
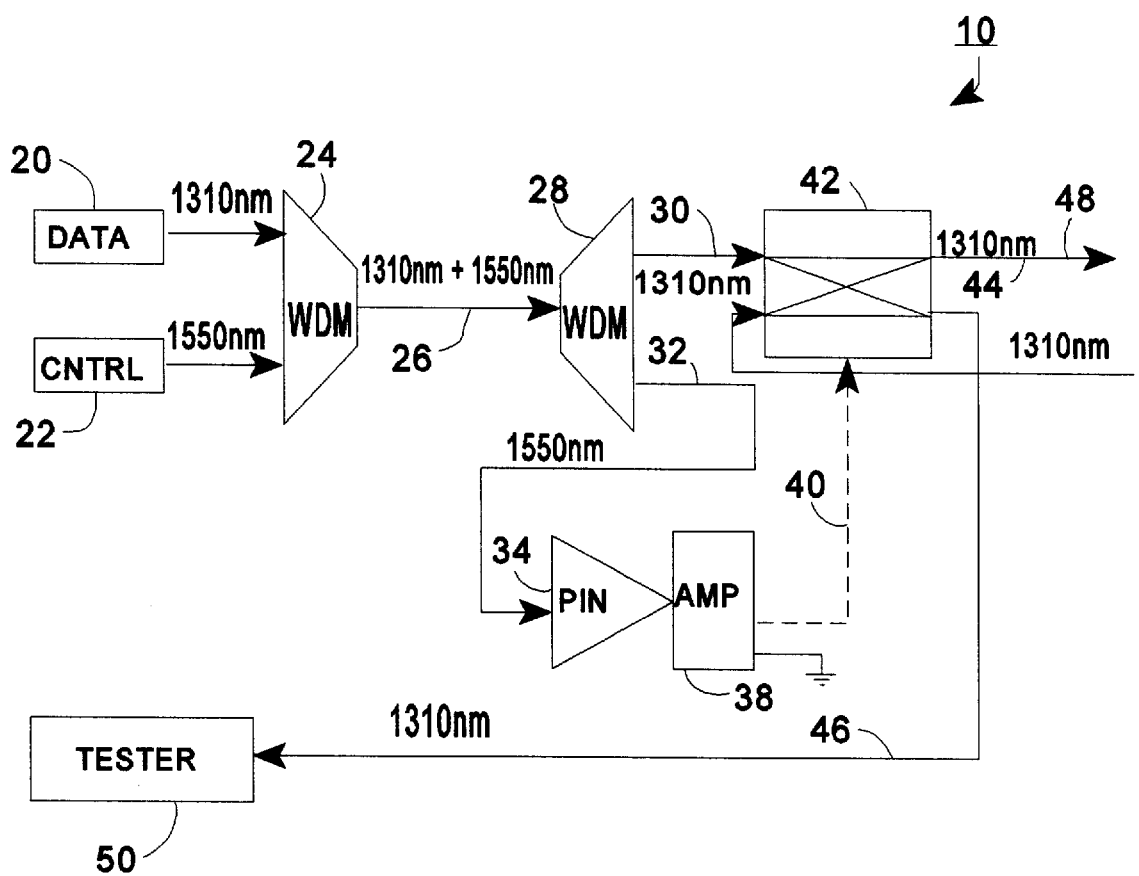
FIG. 1 is a schematic diagram of one embodiment of the invention.

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. The meaning of "light" includes any electromagnetic radiation capable of being transmitted through an optical fiber.

As shown in FIG. 1, one embodiment of the invention 10 includes a light source 20 that generates a data signal having a first wavelength, such as 1310 nm. A second light source 22 generates a control signal having a second wavelength, such as 1550 nm. It is understood that wavelengths other than those receited herein could be employed without departing from the scope of the invention. The first light source 20 and the second light source 22 could include laser diodes, light emitting diodes, or other light sources, depending on the application. In the embodiment shown, the first light source 20 and the second light source 22 would be laser diodes of the type commonly used in optical asynchronous transfer mode (ATM) switches.

A wavelength division multiplexer 24 (WDM), that is optically coupled to both the first light source 20 and the second light source 22, couples the optical signal received from the first light source 20 and the optical signal received from the second light source 22 onto a single optical fiber 26. After transmission on the optical fiber 26, a second wavelength division multiplexer 28, that is optically coupled to the single optical fiber 26, separates the data signal from the control signal. The second wavelength division multiplexer 28 couples the data signal onto a second optical fiber 30 and the control signal onto a third optical fiber 32. The wavelength division multiplexers 24 and 28 could include an FW-13-15 Broadband Filter WDM, available from DiCon Fiberoptics, Inc., 1331 Eighth Street, Berkeley, Calif. 94710.

Instead of using wavelength division multiplexers, diffraction gratings or prisms may be used to combine the data signal with the control signal and to separate them. Also, the signals could be separated using a beam splitter that splits a portion of the beam from the combined signal and a filter that is transmissive to light having the second wavelength and substantially opaque to light having the first wavelength.

An optical sensor 34, such as a PIN diode, that is sensitive to light of the second wavelength asserts an electrical signal 36 when it senses light of the second wavelength. An amplifier 38 amplifies the electrical signal 36 from the optical sensor 34 to generate an electrical control signal 40.

A switch 42, which receives light from the second optical fiber 30 and that is responsive to the control signal 40, is in a first state when the electrical control signal 40 is not asserted and is in a second state when the electrical signal is asserted. The switch 42 could include a 1×2 or a 2×2 optical loop-back switch. Thus, the switch 42 transmits the data signal received from the second fiber 30 to a fourth optical fiber 44 where it may be transmitted to a data receiving device 48, such as an ATM router, when in the first state. When the switch 42 is in the second state, the switch 42 transmits the data signal to a fifth optical fiber 46, which could route the data signal to a tester 50.

In an alternative embodiment, control data packets could be transmitted with the control signal. Such data packets could be used to control more complex operations than two-directional switching, such as switching to more than two ports or sequencing through several events. In such an embodiment, a decoder (not shown) would be coupled to the control signal 40 and would, for example, feed data into a control microprocessor (not shown). The microprocessor could then drive several operations, depending on the control data received.

Figure 2:
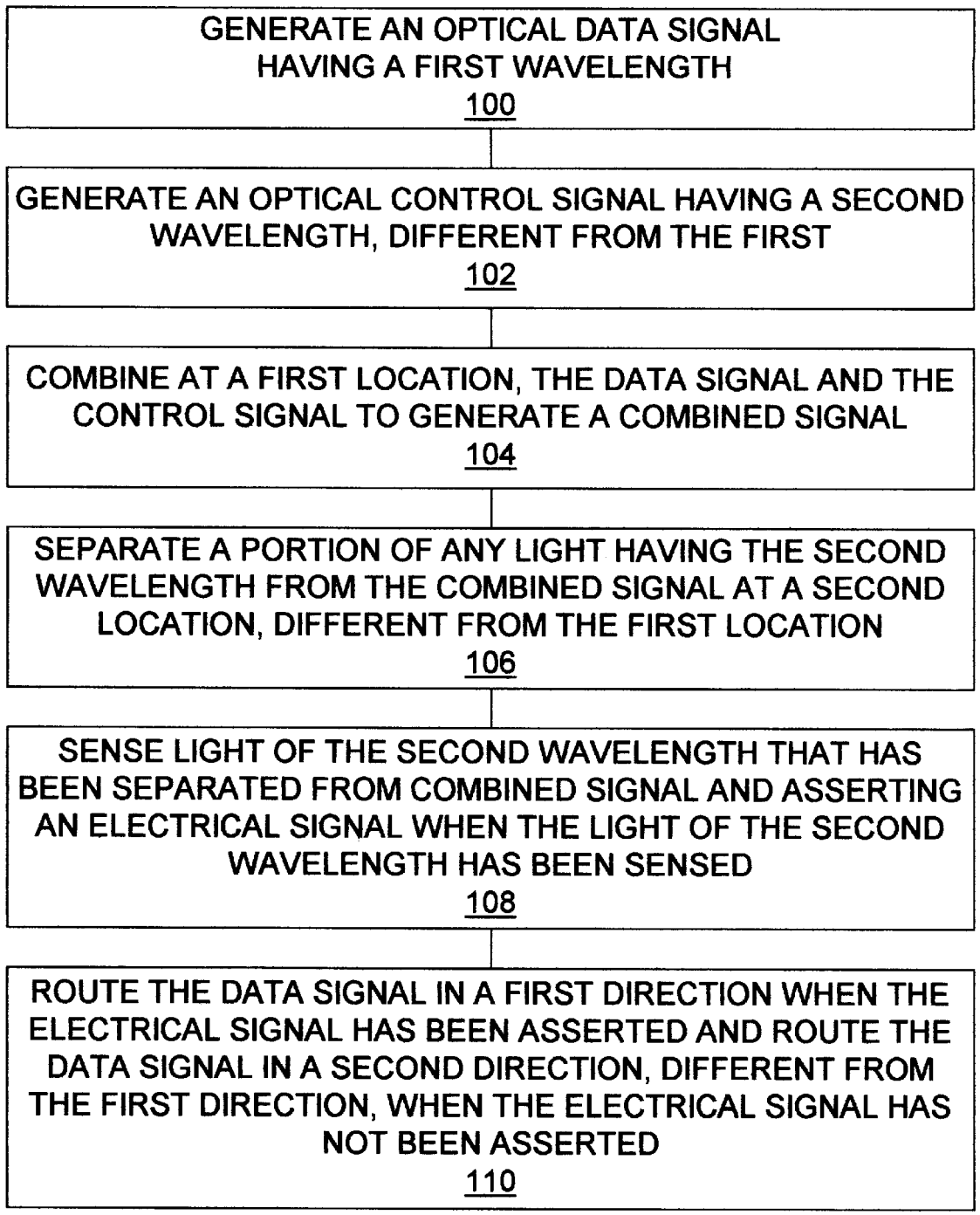
FIG. 2 is a flowchart showing the steps executed in the method of the invention.

As shown in FIG. 2, to execute the method of the invention, the system will generate an optical data signal having a first wavelength 100. Then the system will generate an optical control signal having a second wavelength 102 that is different from the first wavelength. The data signal and the control signal are combined 104 to generate a combined signal. At a second location, different from the first location, a portion of any light having the second wavelength is separated from the combined signal 106. Light of the second wavelength that has been separated from combined signal is sensed 108 and an electrical signal is asserted when the light of the second wavelength has been sensed. The data signal is routed 110 in a first direction when the electrical signal has been asserted and in as second direction, different from the first direction, when the electrical signal has not been asserted.

The above described embodiment is given as an illustrative example only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. A frequency-controlled optical switching system, comprising:
   a. a first light source that is capable of generating a data signal having a first wavelength;
   b. a second light source that is capable of generating a control signal having a second wavelength, different from the first wavelength;
   c. a first wavelength division multiplexer, optically coupled to both the first light source and the second light source so as to couple an optical signal received from the first light source and an optical signal received from the second light source onto a single optical fiber;
   d. a second wavelength division multiplexer, optically coupled to the single optical fiber and spaced apart from the first wavelength division multiplexer, capable of separating a signal having the first wavelength from a signal having the second wavelength and capable of coupling a signal having the first wavelength onto a second optical fiber and coupling a signal having the second wavelength onto a third optical fiber;
   e. an optical sensor, optically coupled to the third optical fiber, and sensitive to light of the second wavelength, capable of asserting an electrical signal when the optical sensor senses light of the second wavelength; and
   f. a switch, responsive to the electrical signal, that is in a first state when the electrical signal is not asserted and in a second state when the electrical signal is asserted.

2. The frequency-controlled optical switching system of claim 1, wherein the optical sensor comprises:
   a. a photo-sensitive diode; and
   b. an amplifier, responsive to the photo sensitive diode, that generates the electrical signal when the photo-sensitive diode senses light.

3. The frequency-controlled optical switching system of claim 1, wherein the switch is an optical 2×2 loop-back switch.

4. A method of routing an optical signal, comprising the steps of:
   a. generating an optical data signal having a first wavelength;
   b. generating an optical control signal having a second wavelength, different from the first wavelength;
   c. combining, at a first location, the data signal and the control signal to generate a combined signal;
   d. separating a portion of any light having the second wavelength from the combined signal at a second location, different from the first location;
   e. sensing light of the second wavelength that has been separated from combined signal and asserting an electrical signal when the light of the second wavelength has been sensed; and
   f. routing the data signal in a first direction when the electrical signal has been asserted and routing the data signal in a second direction, different from the first direction, when the electrical signal has not been asserted.

* * * * *